(12) United States Patent
Liang

(10) Patent No.: US 10,063,385 B2
(45) Date of Patent: Aug. 28, 2018

(54) METHOD AND DEVICE FOR PROCESSING INTERRUPTION OF GROUP COMMUNICATION SERVICE

(71) Applicant: China Academy of Telecommunications Technology, Beijing (CN)

(72) Inventor: Jing Liang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 7 days.

(21) Appl. No.: 15/124,428

(22) PCT Filed: Mar. 12, 2015

(86) PCT No.: PCT/CN2015/074103
§ 371 (c)(1),
(2) Date: Sep. 8, 2016

(87) PCT Pub. No.: WO2015/143994
PCT Pub. Date: Oct. 1, 2015

(65) Prior Publication Data
US 2017/0026192 A1     Jan. 26, 2017

(30) Foreign Application Priority Data
Mar. 26, 2014   (CN) .......................... 2014 1 0117443

(51) Int. Cl.
*H04L 12/18*      (2006.01)
*H04W 76/40*      (2018.01)
(Continued)

(52) U.S. Cl.
CPC ........ *H04L 12/1863* (2013.01); *H04L 65/403* (2013.01); *H04L 65/4076* (2013.01);
(Continued)

(58) Field of Classification Search
CPC ............. H04L 12/1863; H04L 65/4076; H04L 65/403; H04W 76/40; H04W 76/002; H04W 36/00; H04W 4/06
See application file for complete search history.

(56) References Cited

U.S. PATENT DOCUMENTS

2005/0174956 A1* 8/2005 Yi ........................ H04W 76/38
370/312
2006/0268781 A1* 11/2006 Svensson .......... H04W 36/0022
370/331

(Continued)

FOREIGN PATENT DOCUMENTS

| CN | 101547409 | 9/2009 |
| CN | 101841835 A | 9/2010 |

(Continued)

OTHER PUBLICATIONS

International Search Report for PCT/CN2015/074103 dated Jun. 17, 2013.

(Continued)

*Primary Examiner* — Omar J Ghowrwal
(74) *Attorney, Agent, or Firm* — Foley and Lardner LLP

(57) ABSTRACT

Disclosed are a method and device for processing the interruption of a group communication service, which are used for adjusting a continuity parameter of a group communication service after the interruption of the group communication service occurs, so as to ensure the continuity of a subsequent group communication service. The method for processing the interruption of a group communication service provided in the embodiments of the present application comprises: receiving, by a network side, recording information about the continuity of a group communication service which is reported by at least one user equipment (UE), wherein the recording information about the continuity of the group communication service comprises recording infor- (Continued)

mation about the continuity of the group communication service during the interruption of the group communication service in the case where the UE is switched between a unicast transmission manner and a multicast transmission manner or the UE is switched between cells; and according to the recording information about the continuity of the group communication service which is reported by at least one UE, judging, by the network side, whether a continuity parameter of the group communication service is adjusted.

20 Claims, 5 Drawing Sheets

(51) Int. Cl.
    *H04L 29/06*     (2006.01)
    *H04W 36/00*     (2009.01)
    *H04W 4/06*     (2009.01)
    *H04W 76/00*     (2018.01)

(52) U.S. Cl.
    CPC ............ *H04W 4/06* (2013.01); *H04W 36/00* (2013.01); *H04W 76/002* (2013.01); *H04W 76/40* (2018.02)

(56) References Cited

U.S. PATENT DOCUMENTS

| | | | | |
|---|---|---|---|---|
| 2010/0042731 | A1* | 2/2010 | Sparks | H04L 67/14 709/228 |
| 2010/0265868 | A1* | 10/2010 | Jactat | H04W 72/005 370/312 |
| 2011/0110363 | A1* | 5/2011 | Anandani | H04L 12/66 370/352 |
| 2013/0136037 | A1* | 5/2013 | Yang | H04W 76/40 370/260 |
| 2013/0294326 | A1* | 11/2013 | Jiao | H04W 76/12 370/312 |
| 2015/0195396 | A1* | 7/2015 | Ozawa | H04M 7/006 370/315 |
| 2016/0157065 | A1* | 6/2016 | Lee | H04W 4/08 370/312 |
| 2016/0309522 | A1* | 10/2016 | Li | H04W 4/06 |
| 2016/0323719 | A1* | 11/2016 | Wang | H04W 4/08 |
| 2016/0345225 | A1* | 11/2016 | Wang | H04W 4/08 |

FOREIGN PATENT DOCUMENTS

| | | |
|---|---|---|
| CN | 102857867 | 1/2013 |
| WO | WO-2012/093281 | 7/2012 |
| WO | WO-2012/150498 A1 | 11/2012 |
| WO | WO-2012/150790 A2 | 11/2012 |

OTHER PUBLICATIONS

3GPP TR 23.768 V1.0.0 (Dec. 2013); 3rd Generation Partnership Project; Technical Specification Group Services and Systems Aspects; Study on architecture enhancements to support Group Communication System Enablers for LTE (GCSE_LTE)(Release 12).

3GPP TSG RAN WG2 Meeting #85, Methods for Service Continuity Improvement due to UE Mobility, Discussion and Decision, dated Feb. 10-14, 2014, 3 pages, R2-140141, CATT, Prague, Czech Republic.

* cited by examiner

METHOD AND DEVICE FOR PROCESSING INTERRUPTION OF GROUP COMMUNICATION SERVICE

This application is a US National Stage of International Application No. PCT/CN2015/074103, filed on Mar. 12, 2015, designating the United States, and claiming the benefit of Chinese Patent Application No. 201410117443.9, filed with the Chinese Patent Office on Mar. 26, 2014 and entitled "Method and apparatus for processing interruption of a group communication service", which is hereby incorporated by reference in its entirety.

FIELD

The present application relates to the field of communications, and particularly to a method for processing interruption of a group communication service, and an apparatus for processing interruption of a group communication service.

BACKGROUND

The Group Communication System Enabler (GCSE) is a characteristic of the Third-Generation Partnership Project (3GPP) to allow a group communication service to be provided by a Long Term Evolution (LTE) system so as to enable the LTE network provide the same service for user equipments in a group rapidly and efficiently. A general object of the GCSE is to enable the LTE to provide a public and secured group communication service, and as the LTE technology matures, if an operator can provide a group communication function using the LTE system, then after the LTE system matures, a second-generation or third-generation network may not be maintained any longer, so that the network can transition smoothly to the LTE system.

There are two existing transmission modes of a group communication service:

Multicast transmission where group communication data are transmitted to a number of group members over a shared network resource; and Uni-cast transmission where group communication data are transmitted to a specific group member over a User Equipment (UE) specific resource Here multicast transmission is implemented in the LTE system using the existing Multimedia Broadcast/Multicast Service (MBMS) technology, and uni-cast transmission is implemented in the LTE system using the existing uni-cast transmission technology.

The continuity of the group communication service being switched between the two transmission modes needs to be guaranteed.

The network can select the uni-cast transmission mode or the multicast transmission mode to transmit the group communication service, dependent upon the number of subscribers in the group, and the current condition of the network. If the group communication service being transmitted is switched between the uni-cast transmission mode and the multicast transmission mode, then the continuity of the service being switched will be maintained without interrupting the service; otherwise, the experience of the subscribers may be degraded. In an example of a group communication service being interrupted, a UE receives the group communication service in the multicast transmission mode in a current Multicast-Broadcast Single Frequency Network (MBSFN) area, and if the UE moves out of the MBSFN area, then the UE will be unable to further receive the group communication service, so that the group communication service is interrupted. At this time, in order to avoid the group communication service from being interrupted, the UE will be switched from the multicast transmission mode to the uni-cast transmission mode when moving out of the MBSFN area so that the UE further receives the group communication service. Thus in the existing LTE system, uni-cast and multicast transmission is implemented using the existing uni-cast transmission technology and MBMS transmission technology respectively, so the continuity of the group communication service being switched between uni-cast transmission and multicast transmission shall be guaranteed.

In a currently proposed possible solution to guaranteeing the continuity of the service, an eNB configures the terminal with a channel quality threshold in the MBSFN area, and the terminal compares a currently measured quality measurement value of an MBSFN channel with the channel quality measurement threshold, and if the quality measurement value is below the threshold, then the terminal will switch from the multicast transmission mode to the uni-cast transmission mode. However ongoing transmission is not detected for continuity in this solution. Since the group communication service is not dependent upon a geographical position, but can be provided at any position, the performance of the group communication service can be detected through a traditional drive test, for example, by driving along some route. However this detection solution consuming a lot of labors and materials has failed to achieve a good detection effect, and there has been absent in the prior art a solution to processing interruption of the group communication service.

SUMMARY

Embodiments of the application provide a method for processing interruption of a group communication service, and an apparatus for processing interruption of a group communication service so as to adjust a continuity parameter of the group communication service after the group communication service is interrupted, to thereby guarantee the continuity of the subsequent group communication service.

An embodiment of the application provides a method for processing interruption of a group communication service, the method including:

receiving, by the network side, continuity record information of the group communication service reported by at least one User Equipment (UE), wherein the continuity record information of the group communication service includes continuity record information of the group communication service when the group communication service is interrupted in the case that the UE is switched between the uni-cast transmission mode and the multicast transmission mode, or that the UE is switched between cells; and deciding, by the network side, whether to adjust a continuity parameter of the group communication service, according to the continuity record information of the group communication service reported by the at least one UE.

With the method above, if the group communication service is interrupted, for example, the UE fails to further receive the group communication service, or an interruption delay of the group communication service is above a preset delay threshold, then the network side will decide whether to adjust the continuity parameter of the group communication service, by analyzing comprehensively the received continuity record information of the group communication service reported by the least one UE, and if so, then the network side will adjust the continuity parameter of the group communication service, and furthermore the network side can transmit the adjusted continuity parameter of the group communication service to the UE in the current coverage area of the group communication service to thereby guarantee the continuity of receiving the group communication service by the UE in the current coverage area; otherwise, the network side will not adjust the continuity parameter of the group communication service.

Optionally before receiving, by the network side, the continuity record information of the group communication service reported by the at least one UE, the method further includes:

transmitting, by the network side, an instruction to the UE to instruct the UE to record the continuity of the group communication service.

Optionally before transmitting, by the network side, the instruction to the UE to instruct the UE to record the continuity of the group communication service, the method further includes:

receiving, by the network side, capability information reported by the UE to indicate whether the UE supports recording of the continuity of the group communication service; and receiving, by the network side, subscriber information reported by the UE, subscriber information notified by a core network, or subscriber information notified by an Operation, Administration, and Maintenance (OAM) entity; and transmitting, by the network side, the instruction to the UE to instruct the UE to record the continuity of the group communication service includes:

if the UE supports recording of the continuity of the group communication service, then transmitting, by the network side, the instruction to the UE to instruct the UE to record the continuity of the group communication service, according to the subscriber information.

Optionally the instruction includes the identifier of the group communication service to be recorded, a period of time for recording, a report mode, a cell identifier, a Multicast-Broadcast Single Frequency Network (MBSFN) area identifier, and/or an MBMS service identifier.

Optionally receiving, by the network side, the continuity record information of the group communication service reported by the at least one UE includes:

receiving, by the network side, the continuity record information of the group communication service reported by the at least one UE when a preset condition is satisfied; or receiving, by the network side, the continuity record information of the group communication service reported periodically by the at least one UE.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally the periodical report is made at a periodicity which is one of a periodicity configured by the network side, a periodicity as a result of negotiation between the network side and the UE, or a protocol prescribed periodicity.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS Reference Signal Received Power (RSRP), or an MBMS Reference Signal Received Quality (RSRQ), and an MBMS Block Error Ratio (BLER).

Optionally if the network side decides to adjust the continuity parameter of the group communication service, according to the continuity record information of the group communication service reported by the at least one UE, then the method further includes:

adjusting, by the network side, a channel quality measurement threshold of the UE while being switched between the uni-cast transmission mode and the multicast transmission mode, or while being switched between the cells; or changing, by the network side, a channel quality measurement parameter, and setting a channel quality measurement threshold of the changed channel quality measurement parameter; or adjusting, by the network side, a list of boundary cells of a Multicast-Broadcast Single Frequency Network (MBSFN) area of the group communication service.

An embodiment of the application provides another method for processing interruption of a group communication service, the method including:

recording and storing, by a UE, interruption information of the group communication service as continuity record information of the group communication service when the group communication service is interrupted in the case that the UE is switched between the uni-cast transmission mode and the multicast transmission mode, or that the UE is switched between cells; and reporting, by the UE, the continuity record information of the group communication service to the network side to instruct the network side to decide whether to adjust a continuity parameter of the group communication service, according to the continuity record information of the group communication service reported by the at least one UE.

With the method above, if the group communication service is interrupted, for example, the UE fails to further receive the group communication service, or an interruption delay of the group communication service is above a preset delay threshold, then the UE will record and store the interruption information as the continuity record information of the group communication service, and report it to the network side to instruct the network side to decide whether to adjust a continuity parameter of the group communication service, by analyzing comprehensively the continuity record information of the group communication service reported by the at least one UE. If so, then the network side will adjust the continuity parameter of the group communication service, and furthermore the network side can transmit the adjusted continuity parameter of the group communication service to the UE in the current coverage area to thereby guarantee the continuity of receiving the group communication service by the UE in the current coverage area; otherwise, the network side will not adjust the continuity parameter of the group communication service.

Optionally before recording, by the UE, the interruption information of the group communication service, the method further includes:

receiving, by the UE, an instruction transmitted by the network side to instruct the UE to record the continuity of the group communication service.

Optionally before receiving, by the UE, the instruction transmitted by the network side to instruct the UE to record the continuity of the group communication service, the method further includes:

reporting, by the UE, capability information to the network side to indicate whether the UE supports recording of the continuity of the group communication service; and reporting, by the UE, subscriber information to the network side; and the capability information indicating whether the UE supports recording of the continuity of the group communication service, and the subscriber information is such that if the UE supports recording of the continuity of the group communication service, then the network side will transmit the instruction to the UE to instruct the UE to record the continuity of the group communication service, according to the subscriber information.

Optionally the instruction includes the identifier of the group communication service to be recorded, a period of time for recording, a report mode, a cell identifier, an MBSFN area identifier, and/or an MBMS service identifier.

Optionally reporting, by the UE, the continuity record information of the group communication service to the network side includes:

reporting, by the UE, the continuity record information of the group communication service to the network side when a preset condition is satisfied; or reporting, by the UE, periodically the continuity record information of the group communication service to the network side.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally the periodical report is made at a periodicity which is one of a periodicity configured by the network side, a periodicity as a result of negotiation between the network side and the UE, or a protocol prescribed periodicity.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS Reference Signal Received Power (RSRP), or an MBMS Reference Signal Received Quality (RSRQ), and an MBMS Block Error Ratio (BLER).

Optionally if the UE reports the continuity record information of the group communication service to the network side to instruct the network side to decide whether to adjust the continuity parameter of the group communication service, according to the continuity record information of the group communication service reported by the at least one UE, then the network side is further instructed to perform the following operation according to the continuity record information of the group communication service reported by the at least one UE:

the network side adjusts a channel quality measurement threshold of the UE while switching between the uni-cast transmission mode and the multicast transmission mode, or while switching between the cells; or the network side changes a channel quality measurement parameter, and sets a channel quality measurement threshold of the changed channel quality measurement parameter; or the network side adjusts a list of boundary cells of a Multicast-Broadcast Single Frequency Network (MBSFN) area of the group communication service.

An embodiment of the application provides an apparatus for processing interruption of a group communication service, the apparatus including:

a receiving unit configured to receive continuity record information of the group communication service reported by at least one User Equipment (UE), wherein the continuity record information of the group communication service includes continuity record information of the group communication service when the group communication service is interrupted in the case that the UE is switched between the uni-cast transmission mode and the multicast transmission mode, or that the UE is switched between cells; and a deciding unit configured to decide whether to adjust a continuity parameter of the group communication service, according to the continuity record information of the group communication service reported by the at least one UE.

The apparatus for processing interruption of a group communication service at the network side according to the embodiment of the application can be a base station, or an MBMS Coordinating Entity (MCE). If the group communication service is interrupted, for example, the UE fails to further receive the group communication service, or an interruption delay of the group communication service is above a preset delay threshold, then the apparatus can analyze comprehensively the received continuity record information of the group communication service reported by the at least one UE, and then decide whether to adjust the continuity parameter of the group communication service. If so, then the apparatus will adjust the continuity parameter of the group communication service, and furthermore the apparatus can transmit the adjusted continuity parameter of the group communication service to the UE in the current coverage area of the group communication service to thereby guarantee the continuity of receiving the group communication service by the UE in the current coverage area; otherwise, the apparatus will not adjust the continuity parameter of the group communication service.

Optionally the apparatus for processing interruption of a group communication service further includes:

an instruction transmitting unit is configured to transmit an instruction to the UE to instruct the UE to record the continuity of the group communication service.

Optionally the instruction transmitting unit is further configured:

to receive capability information reported by the UE to indicate whether the UE supports recording of the continuity of the group communication service; and to receive subscriber information reported by the UE, subscriber information notified by a core network, or subscriber information notified by an Operation, Administration, and Maintenance (OAM) entity; and if the UE supports recording of the continuity of the group communication service, to transmit the instruction to the UE to instruct the UE to record the continuity of the group communication service, according to the subscriber information.

Optionally the instruction includes the identifier of the group communication service to be recorded, a period of time for recording, a report mode, a cell identifier, an MBSFN area identifier, and/or an MBMS service identifier.

Optionally the receiving unit is configured:

to receive the continuity record information of the group communication service reported by the at least one UE when a preset condition is satisfied; or to receive the continuity record information of the group communication service reported periodically by the at least one UE.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally the periodical report is made at a periodicity which is one of a periodicity configured by the network side, a periodicity as a result of negotiation between the network side and the UE, or a protocol prescribed periodicity.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS Reference Signal Received Power (RSRP), or an MBMS Reference Signal Received Quality (RSRQ), and an MBMS Block Error Ratio (BLER).

Optionally if the network side decides to adjust the continuity parameter of the group communication service, according to the continuity record information of the group communication service reported by the at least one UE, then the deciding unit is further configured:

to adjust a channel quality measurement threshold of the UE while being switched between the uni-cast transmission mode and the multicast transmission mode, or while being switched between the cells; or to change a channel quality measurement parameter, and to set a channel quality measurement threshold of the changed channel quality measurement parameter; or to adjust a list of boundary cells of a Multicast-Broadcast Single Frequency Network (MBSFN) area of the group communication service.

An embodiment of the application provides another apparatus for processing interruption of a group communication service, the apparatus including:

a recording unit configured to record and store interruption information of the group communication service as continuity record information of the group communication service when the group communication service is interrupted in the case that the UE is switched between the uni-cast transmission mode and the multicast transmission mode, or that the UE is switched between cells; and a reporting unit configured to report the continuity record information of the group communication service to the network side to instruct the network side to decide whether to adjust a continuity parameter of the group communication service, according to the continuity record information of the group communication service reported by the at least one UE.

With the other apparatus for processing interruption of a group communication service according to the embodiment of the application, if the group communication service is interrupted, for example, the UE fails to further receive the group communication service, or an interruption delay of the group communication service is above a preset delay threshold, then the UE will record and store the interruption information as the continuity record information of the group communication service, and report it to the network side to instruct the network side to decide whether to adjust a continuity parameter of the group communication service, by analyzing comprehensively the continuity record information of the group communication service reported by the at least one UE. If so, then the network side will adjust the continuity parameter of the group communication service, and furthermore the network side can transmit the adjusted continuity parameter of the group communication service to the UE in the current coverage area to thereby guarantee the continuity of receiving the group communication service by the UE in the current coverage area; otherwise, the network side will not adjust the continuity parameter of the group communication service.

Optionally the other apparatus for processing interruption of a group communication service according to the embodiment of the application further includes:

an instruction receiving unit configured to receive an instruction transmitted by the network side to instruct the UE to record the continuity of the group communication service.

Optionally the instruction receiving unit is further configured:

to report capability information to the network side to indicate whether the UE supports recording of the continuity of the group communication service; and to report subscriber information to the network side; and the capability information to indicate whether the UE supports recording of the continuity of the group communication service, and the subscriber information is such that if the UE supports recording of the continuity of the group communication service, then the network side will transmit the instruction to the UE to instruct the UE to record the continuity of the group communication service, according to the subscriber information.

Optionally the instruction includes the identifier of the group communication service to be recorded, a period of time for recording, a report mode, a cell identifier, an MBSFN area identifier, and/or an MBMS service identifier.

Optionally the reporting unit is configured:

to report the continuity record information of the group communication service to the network side when a preset condition is satisfied; or to report periodically the continuity record information of the group communication service to the network side.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally the periodical report is made at a periodicity which is one of a periodicity configured by the network side, a periodicity as a result of negotiation between the network side and the UE, or a protocol prescribed periodicity.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS Reference Signal Received Power (RSRP), or an MBMS Reference Signal Received Quality (RSRQ), and an MBMS Block Error Ratio (BLER).

Optionally the reporting unit configured to report the continuity record information of the group communication service to the network side to instruct the network side to decide whether to adjust the continuity parameter of the group communication service, according to the continuity record information of the group communication service reported by the at least one UE is further configured to instruct the network side to perform the following operation according to the continuity record information of the group communication service reported by the at least one UE:

the network side adjusts a channel quality measurement threshold of the UE while switching between the uni-cast transmission mode and the multicast transmission mode, or while switching between the cells; or the network side changes a channel quality measurement parameter, and sets a channel quality measurement threshold of the changed channel quality measurement parameter; or the network side adjusts a list of boundary cells of a Multicast-Broadcast Single Frequency Network (MBSFN) area of the group communication service.

DETAILED DESCRIPTION OF THE EMBODIMENTS

Embodiments of the application provide a method for processing interruption of a group communication service, and an apparatus for processing interruption of a group communication service so as to adjust a continuity parameter of the group communication service after the group communication service is interrupted, to thereby guarantee the continuity of the subsequent group communication service.

The technical solutions according to the embodiments of the application will be described below clearly and fully with reference to the drawings in the embodiments of the application, and apparently the embodiments described below are only a part but not all of the embodiments of the application. Based upon the embodiments here of the application, all the other embodiments which can occur to those skilled in the art without any inventive effort shall fall into the scope of the application.

Figure 1:
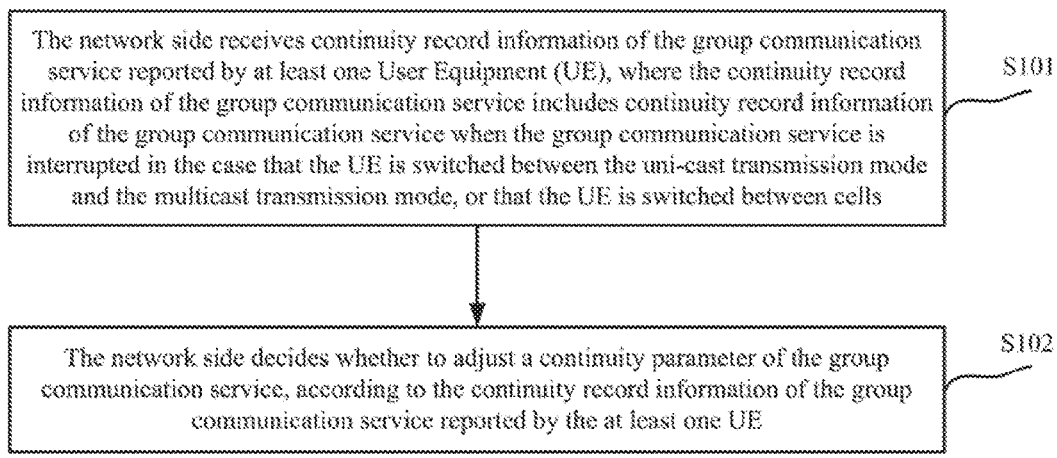
FIG. 1 is a schematic flow chart of a method for processing interruption of a group communication service according to an embodiment of the application.

Referring to FIG. 1, an embodiment of the application provides a method for processing interruption of a group communication service at the network side, where the method includes:

Step S101: The network side receives continuity record information of the group communication service reported by at least one User Equipment (UE), where the continuity record information of the group communication service includes continuity record information of the group communication service when the group communication service is interrupted in the case that the UE is switched between the uni-cast transmission mode and the multicast transmission mode, or that the UE is switched between cells;

Step S102: The network side decides whether to adjust a continuity parameter of the group communication service, according to the continuity record information of the group communication service reported by the at least one UE.

In the step S101, the group communication service may be interrupted, for example, in the case that the UE fails to further receive the group communication service, or an interruption delay of the group communication service is above a preset delay threshold; and In the step S102, in a particular implementation, the network side receives the continuity record information of the group communication service reported by a number of UEs, and thereafter the network analyzes comprehensively the pieces of continuity record information of the group communication service, and decides whether to adjust the continuity parameter of the group communication service, according to an analysis result. If so, then the network side will adjust the continuity parameter of the group communication service, and furthermore the network side can transmit the adjusted continuity parameter of the group communication service to the UE(s) in the current coverage area of the group communication service to thereby guarantee the continuity of receiving the group communication service by the UE(s) in the current coverage area; otherwise, the network side will not adjust the continuity parameter of the group communication service. For example, if there are UE1, UE2, and UE3 accessing the group communication service in the original coverage area, where the group communication service of UE1 and UE2 is interrupted, and the UE1 and UE2 report the continuity record information of the group communication service respectively to the network side, then the network side will decide to adjust the continuity parameter of the group communication service, according to both of the received two pieces of continuity record information of the group communication service, and after the network side adjusts the continuity parameter of the group communication service, UE1 has moved out of the coverage area thereof, while UE4 has entered the coverage area, so the network side transmits the adjusted parameter to UE2. UE3, and UE4.

Optionally before the network side receives the continuity record information of the group communication service reported by the at least one UE, the method further includes:

The network side transmits an instruction to the UE to instruct the UE to record the continuity of the group communication service.

Optionally before the network side transmits the instruction to the UE to instruct the UE to record the continuity of the group communication service, the method further includes:

The network side receives capability information reported by the UE to indicate whether the UE supports recording of the continuity of the group communication service; and The network side receives subscriber information reported by the UE, subscriber information notified by a core network, or subscriber information notified by an Operation, Administration, and Maintenance (OAM) entity; and The network side transmits the instruction to the UE to instruct the UE to record the continuity of the group communication service as follows:

If the UE supports recording of the continuity of the group communication service, then the network side will transmit the instruction to the UE to instruct the UE to record the continuity of the group communication service, according to the subscriber information.

In a particular implementation, if the network side needs to instruct the UE to record the continuity of the group communication service, then the network side will determine, from the capability information indicating whether the UE supports recording of the continuity of the group communication service reported by the UE, that the UE supports recording of the continuity of the group communication service, and then transmit the instruction to the UE to instruct the UE to record the continuity of the group communication service, according to the subscriber information reported by the UE, the subscriber information notified by the core network, or the subscriber information notified by the OAM entity.

Optionally the instruction includes the identifier of the group communication service to be recorded, a period of time for recording, a report mode, a cell identifier, an MBSFN area identifier, and/or an MBMS service identifier.

Optionally the network side receives the continuity record information of the group communication service reported by the at least one user equipment (UE) as follows:

The network side receives the continuity record information of the group communication service reported by the at least one UE when a preset condition is satisfied; or The network side receives the continuity record information of the group communication service reported periodically by the at least one UE.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally the UE reports periodically the continuity record information of the group communication service by reporting periodically the continuity record information of the group communication service at one of a periodicity configured by the network side, a periodicity as a result of negotiation between the network side and the UE, or a protocol prescribed periodicity. If the network transmits the instruction to the UE to instruct the UE to record the continuity of the group communication service, then the periodicity configured by the network side will be included in information about the report mode (a periodical report); or if the UE can record the continuity of the group communication service without being instructed by the network side, then the periodicity will be the periodicity as a result of negotiation between the network side and the UE, or the protocol prescribed periodicity. A particular value of the periodicity can be one report per minute, for example.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS Reference Signal Received Power (RSRP), or an MBMS Reference Signal Received Quality (RSRQ), and an MBMS Block Error Ratio (BLER).

Optionally if the network side decides to adjust the continuity parameter of the group communication service, according to the continuity record information of the group communication service reported by the at least one UE, then the method will further include:

The network side adjusts a channel quality measurement threshold of the UE while being switched between the uni-cast transmission mode and the multicast transmission mode, or while being switched between the cells; or The network side changes a channel quality measurement parameter, and sets a channel quality measurement threshold of the changed channel quality measurement parameter; or The network side adjusts a list of boundary cells of a Multicast-Broadcast Single Frequency Network (MBSFN) area of the group communication service.

If the network side decides to adjust the continuity parameter of the group communication service, according to the continuity record information of the group communication service reported by the at least one UE, then the network side may need to adjust the current channel quality measurement threshold, for example, adjust up an MBMS RSRP threshold; or may need to modify the current channel quality measurement parameter, for example, adjust the MBMS RSRP to an MBMS RSRQ, and set an RSRQ threshold; or when the group communication service is interrupted while being switching between the multicast transmission mode and the uni-cast transmission mode, then if the network side determines that the list of boundary cells of the MBSFN area includes one or more other cells than that or those in an originally set list of boundary cells of the MBSFN area, then the network side will adjust setting of the list of boundary cells of the MBSFN area.

Figure 2:
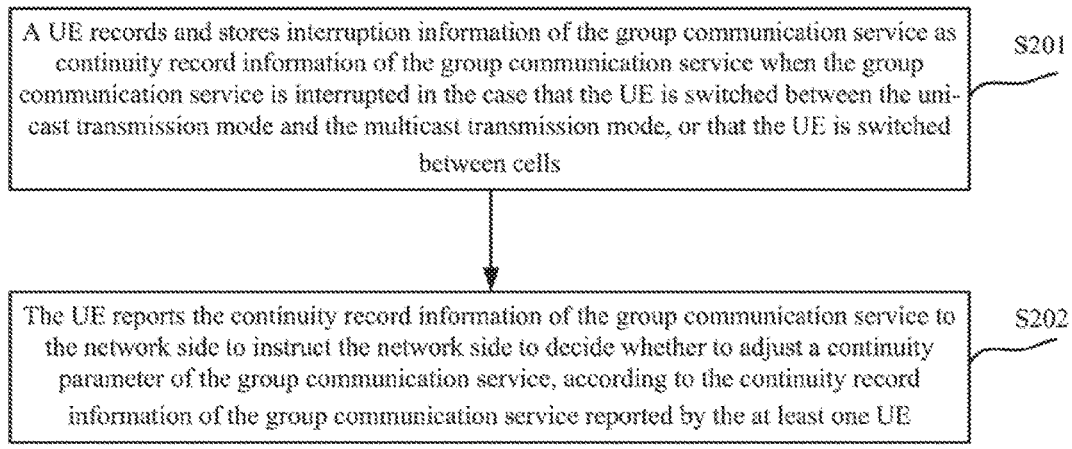
FIG. 2 is a schematic flow chart of another method for processing interruption of a group communication service according to an embodiment of the application.

Referring to FIG. 2, an embodiment of the application further provides another method for processing interruption of a group communication service at the terminal side, where the method includes:

Step S201: A UE records and stores interruption information of the group communication service as continuity record information of the group communication service when the group communication service is interrupted in the case that the UE is switched between the uni-cast transmission mode and the multicast transmission mode, or that the UE is switched between cells; and Step S202: The UE reports the continuity record information of the group communication service to the network side to instruct the network side to decide whether to adjust a continuity parameter of the group communication service, according to the continuity record information of the group communication service reported by the at least one UE.

In the step S201, if the group communication service is interrupted, for example, the UE fails to further receive the group communication service, or an interruption delay of the group communication service is above a preset delay threshold, then the UE will record and store the interruption information as the continuity record information of the group communication service; and In the step S202, the UE reports the continuity record information of the group communication service to the network side to instruct the network side to decide whether to adjust a continuity parameter of the group communication service, by analyzing comprehensively the continuity record information of the group communication service reported by the at least one UE. If so, then the network side will adjust the continuity parameter of the group communication service, and furthermore the network side can transmit the adjusted continuity parameter of the group communication service to the UE in the current coverage area to thereby guarantee the continuity of receiving the group communication service by the UE in the current coverage area; otherwise, the network side will not adjust the continuity parameter of the group communication service.

Optionally before the UE records the interruption information of the group communication service, the method further includes:

The UE receives an instruction transmitted by the network side to instruct the UE to record the continuity of the group communication service.

The UE can receive the instruction transmitted by the network side to instruct the UE to record the continuity of the group communication service; or the UE record the continuity of the group communication service without being instructed by the network side.

Optionally before the UE receives the instruction transmitted by the network side to instruct the UE to record the continuity of the group communication service, the method further includes:

The UE reports capability information to the network side to indicate whether the UE supports recording of the continuity of the group communication service; and The UE reports subscriber information to the network side; and The capability information indicating whether the UE supports recording of the continuity of the group communication service, and the subscriber information is such that if the UE supports recording of the continuity of the group communication service, then the network side will transmit the instruction to the UE to instruct the UE to record the continuity of the group communication service, according to the subscriber information.

Optionally the instruction includes the identifier of the group communication service to be recorded, a period of time for recording, a report mode, a cell identifier, an MBSFN area identifier, and/or an MBMS service identifier.

Optionally the UE reports the continuity record information of the group communication service to the network side as follows:

The UE reports the continuity record information of the group communication service to the network side when a preset condition is satisfied; or The UE reports periodically the continuity record information of the group communication service to the network side.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally if the UE reports periodically the continuity record information of the group communication service to the network side, then the UE will report periodically the continuity record information of the group communication service to the network side at one of a periodicity configured by the network side, a periodicity as a result of negotiation between the network side and the UE, or a protocol prescribed periodicity. If the UE receives the instruction transmitted by the network side to instruct the UE to record the continuity of the group communication service, then the periodicity will be the periodicity configured by the network side; or if the UE records the continuity of the group communication service without being instructed, then the periodicity will be the periodicity as a result of negotiation between the network side and the UE, or the protocol prescribed periodicity. A particular value of the periodicity can be one report per minute, for example.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS RSRP, or an MBMS RSRQ, and an MBMS BLER.

Optionally if the UE transmits the continuity record information of the group communication service to the network side to instruct the network side to decide whether to adjust a continuity parameter of the group communication service, according to the continuity record information of the group communication service reported by the at least one UE, then the network side will be further instructed to perform the following operation according to the continuity record information of the group communication service reported by the at least one UE:

The network side adjusts a channel quality measurement threshold of the UE while being switched between the uni-cast transmission mode and the multicast transmission mode, or while being switched between the cells; or The network side changes a channel quality measurement parameter, and sets a channel quality measurement threshold of the changed channel quality measurement parameter; or The network side adjusts a list of boundary cells of a Multicast-Broadcast Single Frequency Network (MBSFN) area of the group communication service.

The implementations of the method for processing interruption of a group communication service have been described above from the perspectives of the network side and the terminal side respectively. Implementations of the method for processing interruption of a group communication service will be described below in details in three embodiments from the perspective of both the network side and the terminal side.

First Embodiment

An embodiment of the application will be described below in the case that the UE is switched from the uni-cast transmission mode to the multicast transmission mode.

The UE receives the group communication service in the current cell in the uni-cast transmission mode, and as there are an increasing number of UEs receiving the uni-cast transmission mode in the cell, the network side decides to further transmit the service in the multicast transmission mode in order to improve the utilization ratio of resources. Thus the ongoing group communication service will be switched from the uni-cast transmission mode to the multi-cast transmission mode.

At this time the UE detects whether the group communication service is interrupted, for example, whether the UE fails to further receive the group communication service, or whether an interruption delay of the group communication service is above a preset delay threshold. If the group communication service is interrupted while the current transmission mode is being switched, then the UE will record the interruption of the service, and store a record result as continuity record information of the group communication service, where the continuity record information of the group communication service includes the identifier of a cell where the interruption occurs, a channel quality when the interruption occurs (e.g., RSRP or an RSRQ, and MBMS RSRP or an MBMS RSRQ), the identifier of the continuity record information of the interrupted group communication service, geographical positional information of the UE when the interruption occurs:

Furthermore if the UE initiates an RRC connection establishment procedure, an RRC connection reconfiguration procedure, or an RRC connection reestablishment procedure, then the UE will report the continuity record information of the group communication service to the network side, and particularly the UE can put the continuity record information of the group communication service in an RRC Connection Establishment Complete message, an RRC Connection Reconfiguration Complete message, or an RRC Connection Reestablish Complete message, and report the message to the network side; and Furthermore the network side decides whether to adjust the continuity parameter of the group communication service, according to the continuity record information of the group communication service reported by a number of UEs, and if so, then the network side will adjust the continuity parameter of the group communication service; otherwise, the network side will not adjust the continuity parameter of the group communication service.

Figure 3:
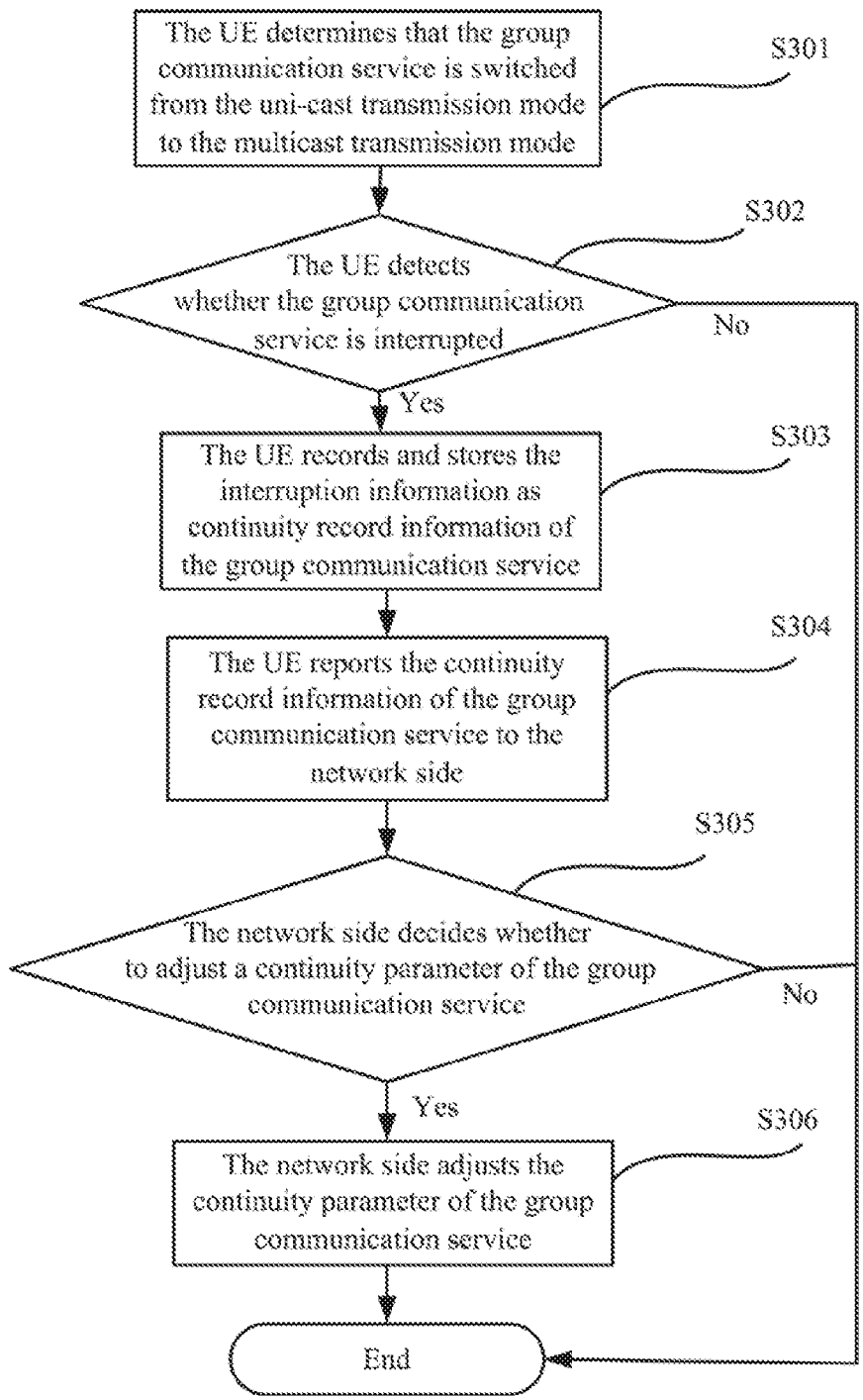
FIG. 3 is a schematic flow chart of a method for processing interruption of a group communication service according to a first embodiment of the application.

Referring to FIG. 3, a flow of the method for processing interruption of a group communication service according to this embodiment is particularly as follows:

Step S301: The UE determines that the group communication service is switched from the uni-cast transmission mode to the multicast transmission mode;

Step S302: The UE detects whether the group communication service is interrupted; and if so, then the flow will proceed to the step S303; otherwise, the flow will end;

Step S303: The UE records and stores the interruption information as continuity record information of the group communication service:

Step S304: The UE reports the continuity record information of the group communication service to the network side:

Step S305: The network side decides whether to adjust a continuity parameter of the group communication service, according to the continuity record information of the group communication service reported by a number of UEs; and if so, then the flow will proceed to the step S306; otherwise, the flow will end; and Step S306: The network side adjusts the continuity parameter of the group communication service.

Second Embodiment

An embodiment of the application will be described below in the case that the UE is switched from the multicast transmission mode to the uni-cast transmission mode.

After the UE enters the connected state, the UE reports capability information to the network side to indicate that the UE supports recording of the continuity of the group communication service, and the network side transmits an instruction to the UE to instruct the UE to record the continuity of the group communication service, according to the capability information indicating that the UE supports recording of the continuity of the group communication service, and subscriber information (which can be subscriber information notified by an OAM entity to a base station at network side), where the instruction can particularly include the identifier of the group communication service to be recorded, a period of time for recording, a report mode (where a report is made when a preset condition is satisfied, or a report is made periodically), a cell identifier, an MBSFN area identifier, and/or an MBMS service identifier.

If the UE receiving the group communication service in some area in the multicast transmission mode (e.g., in the MBMS mode) moves from the MBSFN area to another MBSFN area, or a cell where the UE is currently located decides to subsequently transmit the group communication service for the UE in the uni-cast transmission mode, then the group communication service will be switched from the multicast transmission mode to the uni-cast transmission mode.

At this time the UE detects whether the group communication service is interrupted, for example, whether the UE fails to further receive the group communication service, or whether an interruption delay of the group communication service is above a preset delay threshold. If the group communication service is interrupted while the current transmission mode is being switched, then the UE will record the interruption of the service, and store a record result as continuity record information of the group communication service, where the continuity record information of the group communication service includes the identifier of a cell where the interruption occurs, a channel quality when the interruption occurs (e.g., RSRP or an RSRQ, and MBMS RSRP or an MBMS RSRQ), the identifier of the continuity record information of the interrupted group communication service, geographical positional information of the UE when the interruption occurs.

Furthermore when establishing an RRC connection, reconfiguring an RRC connection, reestablishing an RRC connection, or the UE entering from the interrupted state to the connected state, the UE will transmit a message to the network side to indicate the UE has available continuity record information of the group communication service, according to a report period of time (e.g., one hour), a report mode (e.g., a periodical report), etc., indicated by the network side, and furthermore the network side transmits a request message to the UE to request for reporting the continuity record information of the group communication service, and the UE reports the continuity record information of the group communication service to the network side upon reception of the request message; or when establishing an RRC connection, reconfiguring an RRC connection, reestablishing an RRC connection, or the UE entering from the interrupted state to the connected state, the UE will report the continuity record information of the group communication service directly to the network side.

Still furthermore the UE side analyzes the at least one piece of continuity record information of the group communication service, and decides whether to adjust the continuity parameter of the group communication service, upon reception of the continuity record information of the group communication service reported by the at least one UE.

If the network side decides to adjust the continuity parameter of the group communication service, according to the at least one piece of continuity record information of the group communication service, then the network side will adjust the continuity parameter of the group communication service, and transmit the adjusted continuity parameter of the group communication service, to the UE in the current coverage area of the group communication service.

Particularly the network side adjusts the continuity parameter of the group communication service in the following approaches:

In a first approach:

The network side adjusts a channel quality measurement threshold of the UE while switching from the multicast transmission mode to the uni-cast transmission mode, for example, adjusts an MBMS RSRP threshold. Particularly if the network side determines that the interruption delay of the group communication service is above the preset delay threshold because the service is interrupted in multicast transmission, then the network side will adjust up the MBMS RSRP threshold, for example, from original 3 dB to 4 dB, so that if an MBMS RSRP measurement value is below 4 dB, then the network side will initiate switching from the multicast transmission mode to the uni-cast transmission mode to thereby earlier initiate switching so as to avoid the group communication service from being interrupted; and if the network side determines that the interruption delay of the group communication service is above the preset delay threshold because the service is interrupted in uni-cast transmission, then the network side will adjust down the MBMS RSRP threshold, for example, from original 3 dB to 2 dB, so that only if an MBMS RSRP measurement value is below 2 dB, then the network side will initiate switching from the multicast transmission mode to the uni-cast transmission mode to thereby later initiate switching so as to avoid the group communication service from being interrupted; or In a second approach:

The network side changes a channel quality measurement parameter, and sets a channel quality measurement threshold of the changed channel quality measurement parameter, for example, adjusts MBMS RSRP to an MBMS RSRQ or an MBMS BLER, and accordingly sets an MBMS RSRQ threshold or an MBMS BLER threshold. For example, if the UE originally measured MBMS RSRP, but the network side determines that the group communication service was interrupted because switching from the multicast transmission mode to the uni-cast transmission mode was inaccurately initiated by measuring MBMS RSRP, then the network side will change MBMS RSRP to an MBMS RSRQ, and set a measurement threshold for the MBMS RSRQ; or In a third approach:

The network side adjusts a list of boundary cells of a Multicast-Broadcast Single Frequency Network (MBSFN) area of the group communication service. For example, the list of boundary cells of the MBSFN area configured in the multicast transmission mode includes a cell 1, a cell 2, a cell 3, and a cell 4, but actually the cell 4 does not belong to the list of boundary cells of the MBSFN area. In the case that the UE needs to be switched from the multicast transmission mode to the uni-cast transmission mode, if the UE moves out of the cell 4, then since the configured list of boundary cells of the MBSFN area includes the cell 4, the UE can not initiate switching from the multicast transmission mode to the uni-cast transmission mode although actually the cell 4 does not belong to the list of boundary cells of the MBSFN area, so that the group communication service will be interrupted. In this case, the network side adjusts the list of boundary cells of the MBSFN area, for example, removes the cell 4 from the list.

Figure 4:
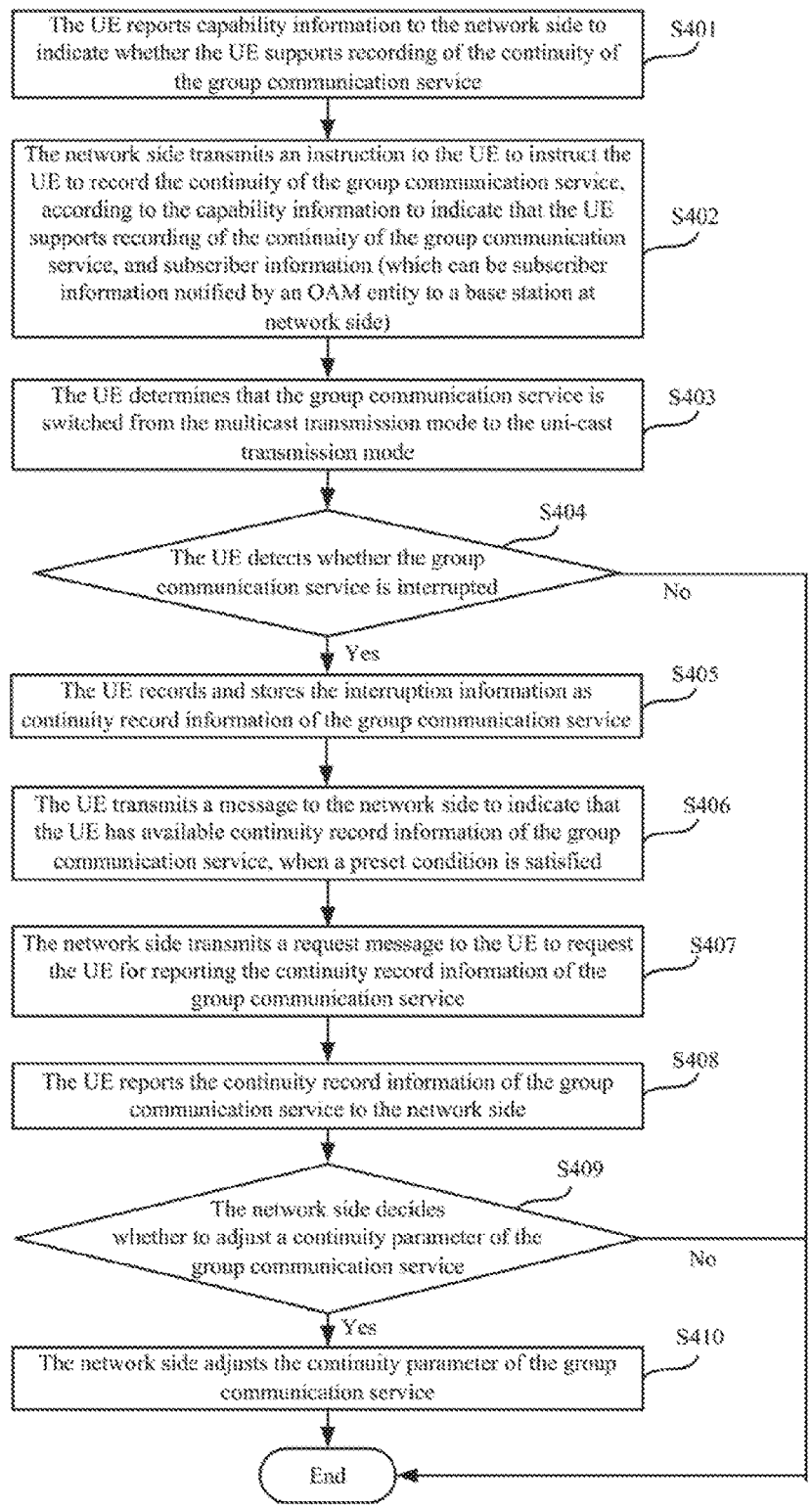
FIG. 4 is a schematic flow chart of a method for processing interruption of a group communication service according to a second embodiment of the application.

Referring to FIG. 4, a flow of the method for processing interruption of a group communication service according to this embodiment is particularly as follows:

Step S401: The UE reports capability information to the network side to indicate whether the UE supports recording of the continuity of the group communication service:

Step S402: The network side transmits an instruction to the UE to instruct the UE to record the continuity of the group communication service, according to the capability information to indicate that the UE supports recording of the continuity of the group communication service, and subscriber information (which can be subscriber information notified by an OAM entity to a base station at network side);

Step S403: The UE determines that the group communication service is switched from the multicast transmission mode to the uni-cast transmission mode;

Step S404: The UE detects whether the group communication service is interrupted; and if so, then the flow will proceed to the step S405; otherwise, the flow will ends;

Step S405: The UE records and stores the interruption information as continuity record information of the group communication service:

Step S406: The UE transmits a message to the network side to indicate that the UE has available continuity record information of the group communication service, when a preset condition is satisfied;

Step S407: The network side transmits a request message to the UE to request the UE for reporting the continuity record information of the group communication service;

Step S408: The UE reports the continuity record information of the group communication service to the network side;

Step S409: The network side decides whether to adjust a continuity parameter of the group communication service, according to the at least one piece of continuity record information of the group communication service; and if so, then the flow will proceed to the step S410; otherwise, the flow will end; and Step S410: The network side adjusts the continuity parameter of the group communication service.

Third Embodiment

An embodiment of the application will be described below in the case the UE is switched between cells.

The UE previously receiving the group communication service in the cell 1 in the uni-cast transmission mode subsequently moves to the cell 2, so the group communication service is switched between the cells.

At this time the UE detects whether the group communication service is interrupted, for example, whether the UE fails to further receive the group communication service, or whether an interruption delay of the group communication service is above a preset delay threshold. If the group communication service is interrupted while the current transmission mode is being switched, then the UE will record the interruption of the service, and store a record result as continuity record information of the group communication service. The particular continuity record information of the group communication service is the same as in the first embodiment and the second embodiment.

Furthermore the UE reports the continuity record information of the group communication service to the network side, particularly in the same way as in the first embodiment or the second embodiment.

The UE analyzes comprehensively the continuity record information of the group communication service reported by the at least one UE, and decides whether to adjust a continuity parameter of the group communication service, upon reception of the continuity record information of the group communication service reported by the UE.

Furthermore the network side decides to adjust the continuity parameter of the group communication service. The continuity parameter of the group communication service is adjusted particularly as in the second embodiment. It shall be noted that there is a specific Quality of Service (QoS) Class Identifier (QCI) of the group communication service, so the continuity parameter of the group communication service will be adjusted differently from the adjustment in the normal uni-cast transmission mode. For example, if an MBMS RSRP threshold needs to be adjusted up, then original 3 dB may be adjusted to 5 dB, for example, in this third embodiment, while in the normal uni-cast transmission mode original 3 dB may be adjusted to only 4 dB.

An apparatus for processing interruption of a group communication service according to an embodiment of the application will be described below.

Figure 5:
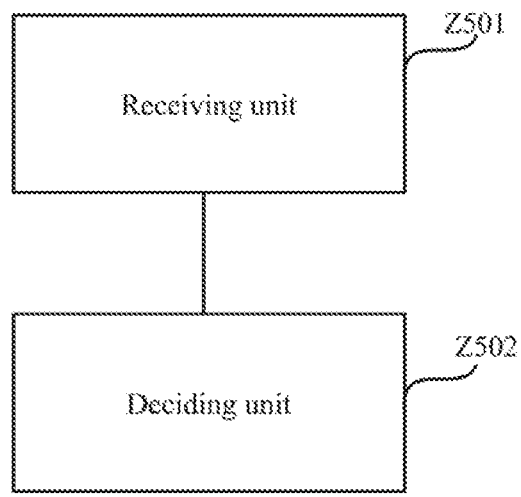
FIG. 5 is a schematic structural diagram of an apparatus for processing interruption of a group communication service according to an embodiment of the application.

As illustrated in FIG. 5, an embodiment of the application provides an apparatus for processing interruption of a group communication service at the network side, where the apparatus includes:

A receiving unit Z501 is configured to receive continuity record information of the group communication service reported by at least one User Equipment (UE), where the continuity record information of the group communication service includes continuity record information of the group communication service when the group communication service is interrupted in the case that the UE is switched between the uni-cast transmission mode and the multicast transmission mode, or that the UE is switched between cells; and A deciding unit Z502 is configured to decide whether to adjust a continuity parameter of the group communication service, according to the continuity record information of the group communication service reported by the at least one UE.

The apparatus for processing interruption of a group communication service at the network side according to the embodiment of the application can be a base station, or an MBMS Coordinating Entity (MCE). If the group communication service is interrupted, for example, the UE fails to further receive the group communication service, or an interruption delay of the group communication service is above a preset delay threshold, then the apparatus can analyze comprehensively the received continuity record information of the group communication service reported by the at least one UE, and then decide whether to adjust the continuity parameter of the group communication service. If so, then the apparatus will adjust the continuity parameter of the group communication service, and furthermore the apparatus can transmit the adjusted continuity parameter of the group communication service to the UE(s) in the current coverage area of the group communication service to thereby guarantee the continuity of receiving the group communication service by the UE(s) in the current coverage area; otherwise, the apparatus will not adjust the continuity parameter of the group communication service.

Optionally the apparatus for processing interruption of a group communication service at the network side further includes:

An instruction transmitting unit is configured to transmit an instruction to the UE to instruct the UE to record the continuity of the group communication service.

Optionally the instruction transmitting unit is further configured:

To receive capability information reported by the UE indicating whether the UE supports recording of the continuity of the group communication service; and To receive subscriber information reported by the UE, subscriber information notified by a core network, or subscriber information notified by an Operation, Administration, and Maintenance (OAM) entity; and If the UE supports recording of the continuity of the group communication service, to transmit the instruction to the UE to instruct the UE to record the continuity of the group communication service, according to the subscriber information.

Optionally the instruction includes the identifier of the group communication service to be recorded, a period of time for recording, a report mode, a cell identifier, an MBSFN area identifier, and/or an MBMS service identifier.

Optionally the receiving unit is configured:

To receive the continuity record information of the group communication service reported by the at least one UE when a preset condition is satisfied; or To receive the continuity record information of the group communication service reported periodically by the at least one UE.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally the UE reports periodically the continuity record information of the group communication service by reporting periodically the continuity record information of the group communication service at one of a periodicity configured by the network side, a periodicity as a result of negotiation between the network side and the UE, or a protocol prescribed periodicity.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS Reference Signal Received Power (RSRP), or an MBMS Reference Signal Received Quality (RSRQ), and an MBMS Block Error Ratio (BLER).

Optionally if the network side decides to adjust the continuity parameter of the group communication service, according to the continuity record information of the group communication service reported by the at least one UE, then the deciding unit will be further configured:

To adjust a channel quality measurement threshold of the UE while being switched between the uni-cast transmission mode and the multicast transmission mode, or while being switched between the cells; or To change a channel quality measurement parameter, and to set a channel quality measurement threshold of the changed channel quality measurement parameter; or To adjust a list of boundary cells of a Multicast-Broadcast Single Frequency Network (MBSFN) area of the group communication service.

Another apparatus for processing interruption of a group communication service according to an embodiment of the application will be described below.

Figure 6:
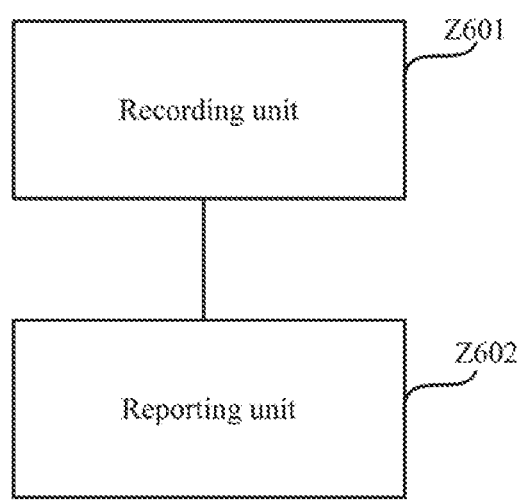
FIG. 6 is a schematic structural diagram of another apparatus for processing interruption of a group communication service according to an embodiment of the application.

As illustrated in FIG. 6, an embodiment of the application provides an apparatus for processing interruption of a group communication service at the terminal side, where the apparatus includes:

A recording unit Z601 is configured to record and store interruption information of the group communication service as continuity record information of the group communication service when the group communication service is interrupted in the case that the UE is switched between the uni-cast transmission mode and the multicast transmission mode, or that the UE is switched between cells; and A reporting unit Z602 is configured to report the continuity record information of the group communication service to the network side to instruct the network side to decide whether to adjust a continuity parameter of the group communication service, according to the continuity record information of the group communication service reported by the at least one UE.

The apparatus for processing interruption of a group communication service at the terminal side according to the embodiment of the application can be a UE, and if the group communication service is interrupted, for example, the UE fails to further receive the group communication service, or an interruption delay of the group communication service is above a preset delay threshold, then the UE will record and store the interruption information as the continuity record information of the group communication service, and report it to the network side to instruct the network side to decide whether to adjust a continuity parameter of the group communication service, by analyzing comprehensively the continuity record information of the group communication service reported by the at least one UE. If so, then the network side will adjust the continuity parameter of the group communication service, and furthermore the network side can transmit the adjusted continuity parameter of the group communication service to the UE(s) in the current coverage area to thereby guarantee the continuity of receiving the group communication service by the UE(s) in the current coverage area; otherwise, the network side will not adjust the continuity parameter of the group communication service.

Optionally the apparatus for processing interruption of a group communication service at the terminal side further includes:

An instruction receiving unit is configured to receive an instruction transmitted by the network side to instruct the UE to record the continuity of the group communication service.

Optionally the instruction receiving unit is further configured:

To report capability information to the network side to indicate whether the UE supports recording of the continuity of the group communication service; and To report subscriber information to the network side; and The capability information indicating whether the UE supports recording of the continuity of the group communication service, and the subscriber information is such that if the UE supports recording of the continuity of the group communication service, then the network side will transmit the instruction to the UE to instruct the UE to record the continuity of the group communication service, according to the subscriber information.

Optionally the instruction includes the identifier of the group communication service to be recorded, a period of time for recording, a report mode, a cell identifier, an MBSFN area identifier, and/or an MBMS service identifier.

Optionally the reporting unit is configured:

To report the continuity record information of the group communication service to the network side when a preset condition is satisfied; or To report periodically the continuity record information of the group communication service to the network side.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally if the UE reports periodically the continuity record information of the group communication service to the network side, then the UE will report periodically the continuity record information of the group communication service to the network side at one of a periodicity configured by the network side, a periodicity as a result of negotiation between the network side and the UE, or a protocol prescribed periodicity.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS RSRP, or an MBMS RSRQ, and an MBMS BLER.

Optionally the reporting unit configured to report the continuity record information of the group communication service to the network side to instruct the network side to decide whether to adjust the continuity parameter of the group communication service, according to the continuity record information of the group communication service reported by the at least one UE is further configured to instruct the network side to perform the following operation according to the continuity record information of the group communication service reported by the at least one UE:

The network side adjusts a channel quality measurement threshold of the UE while switching between the uni-cast transmission mode and the multicast transmission mode, or while switching between the cells; or The network side changes a channel quality measurement parameter, and sets a channel quality measurement threshold of the changed channel quality measurement parameter; or The network side adjusts a list of boundary cells of a Multicast-Broadcast Single Frequency Network (MBSFN) area of the group communication service.

Figure 7:
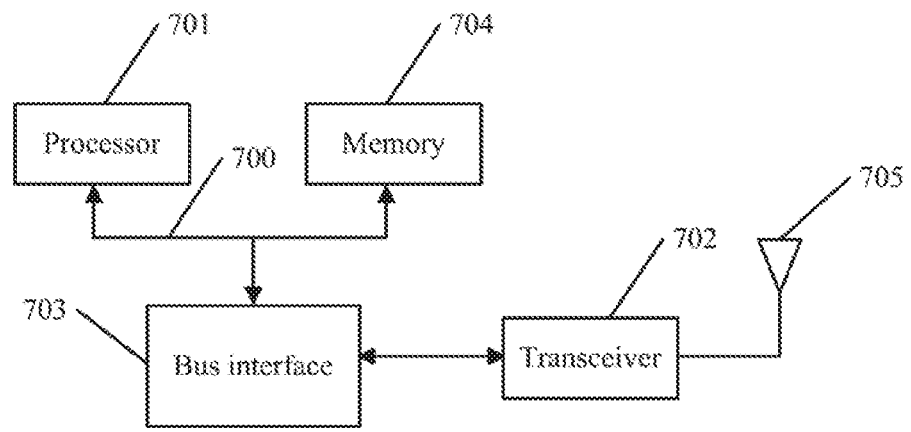
FIG. 7 is a schematic structural diagram of another apparatus for processing interruption of a group communication service according to an embodiment of the application.

As illustrated in FIG. 7, an embodiment of the application provides another apparatus for processing interruption of a group communication service, where the apparatus includes:

A processor 701 is configured to read program in a memory 704, and to perform the operations of:

Receiving continuity record information of the group communication service reported by at least one User Equipment (UE) through a transceiver 702, where the continuity record information of the group communication service includes continuity record information of the group communication service when the group communication service is interrupted in the case that the UE is switched between the uni-cast transmission mode and the multicast transmission mode, or that the UE is switched between cells; and deciding whether to adjust a continuity parameter of the group communication service, according to the continuity record information of the group communication service reported by the at least one UE; and The transceiver 702 is configured to be controlled by the processor 701 to transmit and receive data.

The apparatus for processing interruption of a group communication service at the network side according to the embodiment of the application can be a base station, or an MBMS Coordinating Entity (MCE). If the group communication service is interrupted, for example, the UE fails to further receive the group communication service, or an interruption delay of the group communication service is above a preset delay threshold, then the apparatus can analyze comprehensively the received continuity record information of the group communication service reported by the at least one UE, and then decide whether to adjust the continuity parameter of the group communication service. If so, then the apparatus will adjust the continuity parameter of the group communication service, and furthermore the apparatus can transmit the adjusted continuity parameter of the group communication service to the UE(s) in the current coverage area of the group communication service to thereby guarantee the continuity of receiving the group communication service by the UE(s) in the current coverage area; otherwise, the apparatus will not adjust the continuity parameter of the group communication service.

Optionally the processor 701 is further configured to transmit an instruction to the UE to instruct the UE to record the continuity of the group communication service through the transceiver 702.

Optionally the processor 701 is further configured to:

To receive capability information reported by the UE to indicate whether the UE supports recording of the continuity of the group communication service through the transceiver 702; and to receive subscriber information reported by the UE, subscriber information notified by a core network, or subscriber information notified by an Operation, Administration, and Maintenance (OAM) entity through the transceiver 702; and If the UE supports recording of the continuity of the group communication service, to transmit the instruction to the UE to instruct the UE to record the continuity of the group communication service, through the transceiver 702 according to the subscriber information.

Optionally the instruction includes the identifier of the group communication service to be recorded, a period of time for recording, a report mode, a cell identifier, an MBSFN area identifier, and/or an MBMS service identifier.

Optionally the processor 701 is configured:

To receive the continuity record information of the group communication service reported by the at least one UE when a preset condition is satisfied, through the transceiver 702; or to receive the continuity record information of the group communication service reported periodically by the at least one UE through the transceiver 702.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally the UE reports periodically the continuity record information of the group communication service by reporting periodically the continuity record information of the group communication service at one of a periodicity configured by the network side, a periodicity as a result of negotiation between the network side and the UE, or a protocol prescribed periodicity.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS Reference Signal Received Power (RSRP), or an MBMS Reference Signal Received Quality (RSRQ), and an MBMS Block Error Ratio (BLER).

Optionally if the network side decides to adjust the continuity parameter of the group communication service, according to the continuity record information of the group communication service reported by the at least one UE, then the processor 701 will be further configured:

To adjust a channel quality measurement threshold of the UE while being switched between the uni-cast transmission mode and the multicast transmission mode, or while being switched between the cells; or To change a channel quality measurement parameter, and to set a channel quality measurement threshold of the changed channel quality measurement parameter; or To adjust a list of boundary cells of a Multicast-Broadcast Single Frequency Network (MBSFN) area of the group communication service.

In FIG. 7, there is a bus architecture (represented as a bus 700), and the bus 700 can include any number of interconnected buses and bridges. The bus 700 links together various circuits including one or more processors represented by the processor 701, and one or more memories represented by the memory 704. The bus 700 can further link together various other circuits, e.g., peripheral devices, a voltage stabilizer, a power management circuit, etc., and all of these circuits are well known in the art, so a further description thereof will be omitted in this context. The bus interface 703 serves as an interface between the bus 700 and the transceiver 702. The transceiver 702 can include one or more elements, including a number of transmitters and receivers, serving as elements configured to communicate with various other devices over a transmission medium. Data processed by the processor 701 are transmitted by the antenna 705 over a wireless medium, and furthermore the antenna 705 further receives and transmits data to the processor 701.

The processor 701 is responsible for managing the bus 700 and performing other normal processes, and can further perform various functions including timing, a peripheral interface, voltage regulation, power source management, and other control functions, and the memory 704 can be configured to store data for use by the processor 701 in operation.

Optionally the processor 701 can include a Central Processing Unit (CPU), an Application Specific Integrated Circuit (ASIC), a Field Programmable Gate Array (FPGA), or a Complex Programmable Logic Device (CPLD).

Figure 8:
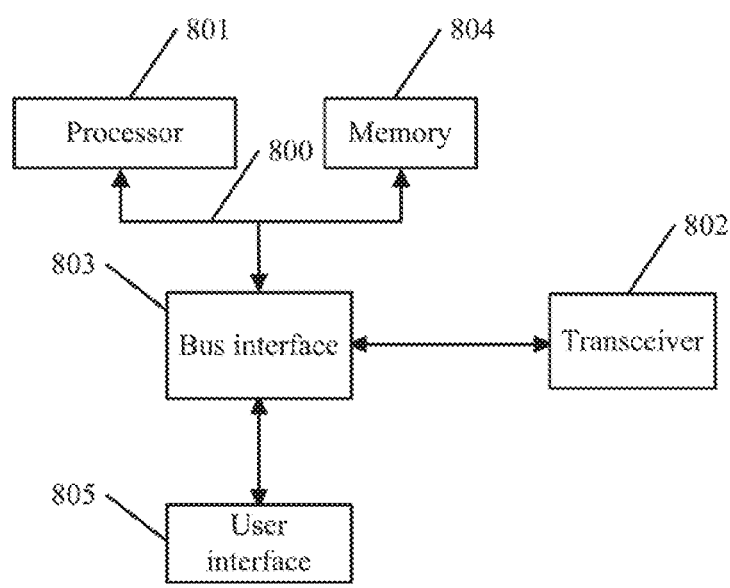
FIG. 8 is a schematic structural diagram of another apparatus for processing interruption of a group communication service according to an embodiment of the application.

As illustrated in FIG. 8, an embodiment of the application provides another apparatus for processing interruption of a group communication service, where the apparatus includes:

A processor 801 is configured to read program in a memory 804, and to perform the operations of:

Recording and storing interruption information of the group communication service as continuity record information of the group communication service when the group communication service is interrupted in the case that a UE is switched between the uni-cast transmission mode and the multicast transmission mode, or that the UE is switched between cells; and to control a transceiver 802 to report the continuity record information of the group communication service to the network side to instruct the network side to decide whether to adjust a continuity parameter of the group communication service, according to the continuity record information of the group communication service reported by the at least one UE; and The transceiver 802 is configured to be controlled by the processor 801 to transmit and receive data.

The apparatus for processing interruption of a group communication service at the terminal side according to the embodiment of the application can be a UE, and if the group communication service is interrupted, for example, the UE fails to further receive the group communication service, or an interruption delay of the group communication service is above a preset delay threshold, then the UE will record and store the interruption information as the continuity record information of the group communication service, and report it to the network side to instruct the network side to decide whether to adjust a continuity parameter of the group communication service, by analyzing comprehensively the continuity record information of the group communication service reported by the at least one UE. If so, then the network side will adjust the continuity parameter of the group communication service, and furthermore the network side can transmit the adjusted continuity parameter of the group communication service to the UE(s) in the current coverage area to thereby guarantee the continuity of receiving the group communication service by the UE(s) in the current coverage area; otherwise, the network side will not adjust the continuity parameter of the group communication service.

Optionally the processor 801 is further configured to control the transceiver 802 to receive an instruction transmitted by the network side to instruct the UE to record the continuity of the group communication service.

Optionally the processor 801 is further configured:

To report capability information to the network side to indicate whether the UE supports recording of the continuity of the group communication service; and to control the transceiver 802 to report subscriber information to the network side; and The capability information indicating whether the UE supports recording of the continuity of the group communication service, and the subscriber information is such that if the UE supports recording of the continuity of the group communication service, then the network side will transmit the instruction to the UE to instruct the UE to record the continuity of the group communication service, according to the subscriber information.

Optionally the instruction includes the identifier of the group communication service to be recorded, a period of time for recording, a report mode, a cell identifier, an MBSFN area identifier, and/or an MBMS service identifier.

Optionally the processor 801 is configured:

To control the transceiver 802 to report the continuity record information of the group communication service to the network side when a preset condition is satisfied; or To control the transceiver 802 to report periodically the continuity record information of the group communication service to the network side.

Optionally the preset condition includes establishment of a Radio Resource Control (RRC) connection, reconfiguration of an RRC connection, reestablishment of an RRC connection, or an entry of the UE from a group communication service interrupted state into a group communication service connected state.

Optionally if the UE reports periodically the continuity record information of the group communication service to the network side, then the UE will report periodically the continuity record information of the group communication service to the network side at one of a periodicity configured by the network side, a periodicity as a result of negotiation between the network side and the UE, or a protocol prescribed periodicity.

Optionally the continuity record information of the group communication service includes a cell identifier, an MBSFN area identifier, channel quality information, a group communication service identifier, geographical positional information of the UE, a period of time for which the group communication service has been interrupted, and/or a transmission mode when the group communication service takes place, where the channel quality information can include MBMS RSRP, or an MBMS RSRQ, and an MBMS BLER.

Optionally the processor 801 configured to report the continuity record information of the group communication service to the network side through the transceiver 802 to instruct the network side to decide whether to adjust the continuity parameter of the group communication service, according to the continuity record information of the group communication service reported by the at least one UE is further configured to instruct to the network side to perform the following operation according to the continuity record information of the group communication service reported by the at least one UE:

The network side adjusts a channel quality measurement threshold of the UE while switching between the uni-cast transmission mode and the multicast transmission mode, or while switching between the cells; or The network side changes a channel quality measurement parameter, and sets a channel quality measurement threshold of the changed channel quality measurement parameter; or The network side adjusts a list of boundary cells of a Multicast-Broadcast Single Frequency Network (MBSFN) area of the group communication service.

In FIG. 8, there is a bus architecture (represented as a bus 800), and the bus 800 can include any number of interconnected buses and bridges. The bus 800 links together various circuits including one or more processors represented by the processor 801, and one or more memories represented by the memory 804. The bus 800 can further link together various other circuits, e.g., peripheral devices, a voltage stabilizer, a power management circuit, etc., and all of these circuits are well known in the art, so a further description thereof will be omitted in this context. The bus interface 803 serves as an interface between the bus 800 and the transceiver 802. The transceiver 802 can include one or more elements, including a number of transmitters and receivers, serving as elements configured to communicate with various other devices over a transmission medium. Data processed by the processor 801 are transmitted by the transceiver 802 to other devices. Further, a user interface 805, such as a keyboard, display, speaker, microphone and joystick, can also be provided, dependent upon the nature of the computing system.

The processor 801 is responsible for managing the bus 800 and performing other normal processes, such as running the general purpose operating system, and the memory 804 can be configured to store data for use by the processor 801 in operation.

Optionally the processor 801 can include a CPU, an ASIC, an FPGA, or a CPLD.

In summary, the embodiments of the application provide a method for processing interruption of a group communication service, and an apparatus for processing interruption of a group communication service so that if the group communication service is interrupted, then a User equipment (UE) will record and store the interruption of the service as continuity record information of the group communication service, and further report it to the network side, and the network side will decide whether to adjust a continuity parameter of the group communication service, according to the received continuity record information of the group communication service reported by the at least one UE, and furthermore if so, then the network side can adjust the continuity parameter of the group communication service in a timely manner so as to guarantee the continuity of the subsequent group communication service.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for processing interruption of a group communication service, the method comprising:
   receiving, by a network side, continuity record information of the group communication service reported by at least one User Equipment, UE, wherein the continuity record information of the group communication service comprises continuity record information of the group communication service when the group communication service is interrupted in a case that the UE is switched between a uni-cast transmission mode and a multicast transmission mode, or that the UE is switched between cells; and
   deciding, by the network side, whether to adjust a continuity parameter of the group communication service, according to the continuity record information of the group communication service reported by the at least one UE.

2. The processing method according to claim 1, wherein before receiving, by the network side, the continuity record information of the group communication service reported by the at least one UE, the method further comprises:
   transmitting, by the network side, an instruction to the UE to instruct the UE to record the continuity of the group communication service.

3. The processing method according to claim 2, wherein before transmitting, by the network side, the instruction to the UE to instruct the UE to record the continuity of the group communication service, the method further comprises:
   receiving, by the network side, capability information reported by the UE to indicate whether the UE supports recording of the continuity of the group communication service; and
   receiving, by the network side, subscriber information reported by the UE, subscriber information notified by a core network, or subscriber information notified by an Operation, Administration, and Maintenance, OAM, entity; and
   transmitting, by the network side, the instruction to the UE to instruct the UE to record the continuity of the group communication service comprises:
   if the UE supports recording of the continuity of the group communication service, then transmitting, by the network side, the instruction to the UE to instruct the UE to record the continuity of the group communication service, according to the subscriber information.

4. The processing method according to claim 2, wherein the instruction comprises an identifier of the group communication service to be recorded, a period of time for recording, a report mode, a cell identifier, a Multicast-Broadcast Single Frequency Network, MBSFN, area identifier, and/or an MBMS service identifier.

5. The processing method according to claim 1, wherein receiving, by the network side, the continuity record information of the group communication service reported by the at least one UE comprises:
   receiving, by the network side, the continuity record information of the group communication service reported by the at least one UE when a preset condition is satisfied; or
   receiving, by the network side, the continuity record information of the group communication service reported periodically by the at least one UE.

6. The processing method according to claim 1, wherein the continuity record information of the group communication service comprises a cell identifier, an MBSFN area identifier, channel quality information, a group communication service identifier, geographical positional information of the UE, a period of time for which the group communication service has been interrupted, and/or a transmission mode when the group communication service takes place.

7. The processing method according to claim 6, wherein if the network side decides to adjust the continuity parameter of the group communication service, according to the continuity record information of the group communication service reported by the at least one UE, then the method further comprises:
   adjusting, by the network side, a channel quality measurement threshold of the UE while being switched between the uni-cast transmission mode and the multicast transmission mode, or while being switched between the cells; or
   changing, by the network side, a channel quality measurement parameter, and setting a channel quality measurement threshold of the changed channel quality measurement parameter; or
   adjusting, by the network side, a list of boundary cells of a Multicast-Broadcast Single Frequency Network, MBSFN, area of the group communication service.

8. A method for processing interruption of a group communication service, the method comprising:
   recording and storing, by a UE, interruption information of the group communication service as continuity record information of the group communication service when the group communication service is interrupted in a case that the UE is switched between a uni-cast transmission mode and a multicast transmission mode, or that the UE is switched between cells; and reporting, by the UE, the continuity record information of the group communication service to a network side to instruct the network side to decide whether to adjust a continuity parameter of the group communication service, according to the continuity record information of the group communication service reported by the at least one UE.

9. The processing method according to claim 8, wherein before recording, by the UE, the interruption information of the group communication service, the method further comprises:

receiving, by the UE, an instruction transmitted by the network side to instruct the UE to record the continuity of the group communication service.

10. The processing method according to claim 9, wherein before receiving, by the UE, the instruction transmitted by the network side to instruct the UE to record the continuity of the group communication service, the method further comprises:

reporting, by the UE, capability information to the network side to indicate whether the UE supports recording of the continuity of the group communication service; and reporting, by the UE, subscriber information to the network side; and the capability information indicating whether the UE supports recording of the continuity of the group communication service, and the subscriber information is such that if the UE supports recording of the continuity of the group communication service, then the network side will transmit the instruction to the UE to instruct the UE to record the continuity of the group communication service, according to the subscriber information.

11. The processing method according to claim 9, wherein the instruction comprises an identifier of the group communication service to be recorded, a period of time for recording, a report mode, a cell identifier, an MBSFN area identifier, and/or an MBMS service identifier.

12. The processing method according to claim 8, wherein reporting, by the UE, the continuity record information of the group communication service to the network side comprises:

reporting, by the UE, the continuity record information of the group communication service to the network side when a preset condition is satisfied; or reporting, by the UE, periodically the continuity record information of the group communication service to the network side.

13. The processing method according to claim 8, wherein the continuity record information of the group communication service comprises a cell identifier, an MBSFN area identifier, channel quality information, a group communication service identifier, geographical positional information of the UE, a period of time for which the group communication service has been interrupted, and/or a transmission mode when the group communication service takes place.

14. The processing method according to claim 13, wherein if the UE reports the continuity record information of the group communication service to the network side to instruct the network side to decide whether to adjust the continuity parameter of the group communication service, according to the continuity record information of the group communication service reported by the at least one UE, then the network side is further instructed to perform following operations according to the continuity record information of the group communication service reported by the at least one UE:

the network side adjusts a channel quality measurement threshold of the UE while switching between the uni-cast transmission mode and the multicast transmission mode, or while switching between the cells; or the network side changes a channel quality measurement parameter, and sets a channel quality measurement threshold of the changed channel quality measurement parameter; or the network side adjusts a list of boundary cells of a Multicast-Broadcast Single Frequency Network, MBSFN, area of the group communication service.

15. An apparatus for processing interruption of a group communication service, the apparatus comprising:

a processor and a memory, wherein the memory stores one or more computer readable program codes, and the processor is configured to execute the computer readable program codes, to record and store interruption information of the group communication service as continuity record information of the group communication service when the group communication service is interrupted in a case that the UE is switched between a uni-cast transmission mode and a multicast transmission mode, or that the UE is switched between cells; and control a transceiver to report the continuity record information of the group communication service to a network side to instruct the network side to decide whether to adjust a continuity parameter of the group communication service, according to the continuity record information of the group communication service reported by the at least one UE;

the transceiver configured to be controlled by the processor to transmit and receive data.

16. The processing apparatus according to claim 15, wherein the processor is further configured to control the transceiver to:

receive an instruction transmitted by the network side to instruct the UE to record the continuity of the group communication service.

17. The processing apparatus according to claim 16, wherein the processor is further configured to control the transceiver:

to report capability information to the network side to indicate whether the UE supports recording of the continuity of the group communication service; and to report subscriber information to the network side; and the capability information indicating whether the UE supports recording of the continuity of the group communication service, and the subscriber information is such that if the UE supports recording of the continuity of the group communication service, then the network side will transmit the instruction to the UE to instruct the UE to record the continuity of the group communication service, according to the subscriber information.

18. The processing apparatus according to claim 16, wherein the instruction comprises an identifier of the group communication service to be recorded, a period of time for recording, a report mode, a cell identifier, an MBSFN area identifier, and/or an MBMS service identifier.

19. The processing apparatus according to claim 15, wherein the processor is further configured to control the transceiver:
- to report the continuity record information of the group communication service to the network side when a preset condition is satisfied; or
- to report periodically the continuity record information of the group communication service to the network side.

20. The processing apparatus according to claim 15, wherein the continuity record information of the group communication service comprises a cell identifier, an MBSFN area identifier, channel quality information, a group communication service identifier, geographical positional information of the UE, a period of time for which the group communication service has been interrupted, and/or a transmission mode when the group communication service takes place.

* * * * *